Oct. 3, 1944.   W. DIELSCHNEIDER   2,359,358
WEED MOWING MACHINE
Filed June 9, 1943   3 Sheets-Sheet 2
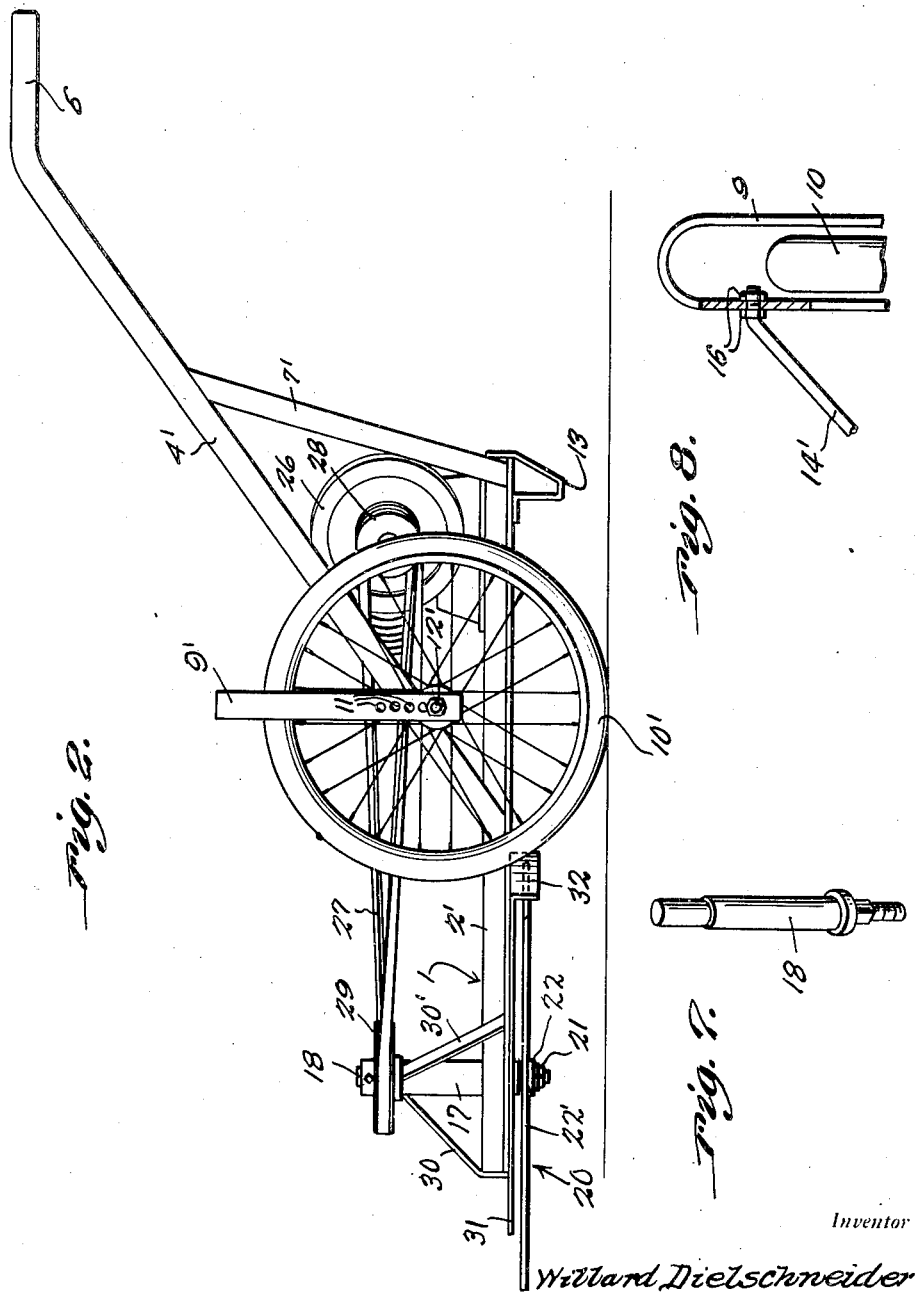
Inventor
Willard Dielschneider
By Clarence A. O'Brien
and Harvey B. Jacobson
Attorneys Oct. 3, 1944.   W. DIELSCHNEIDER   2,359,358
WEED MOWING MACHINE
Filed June 9, 1943   3 Sheets-Sheet 3
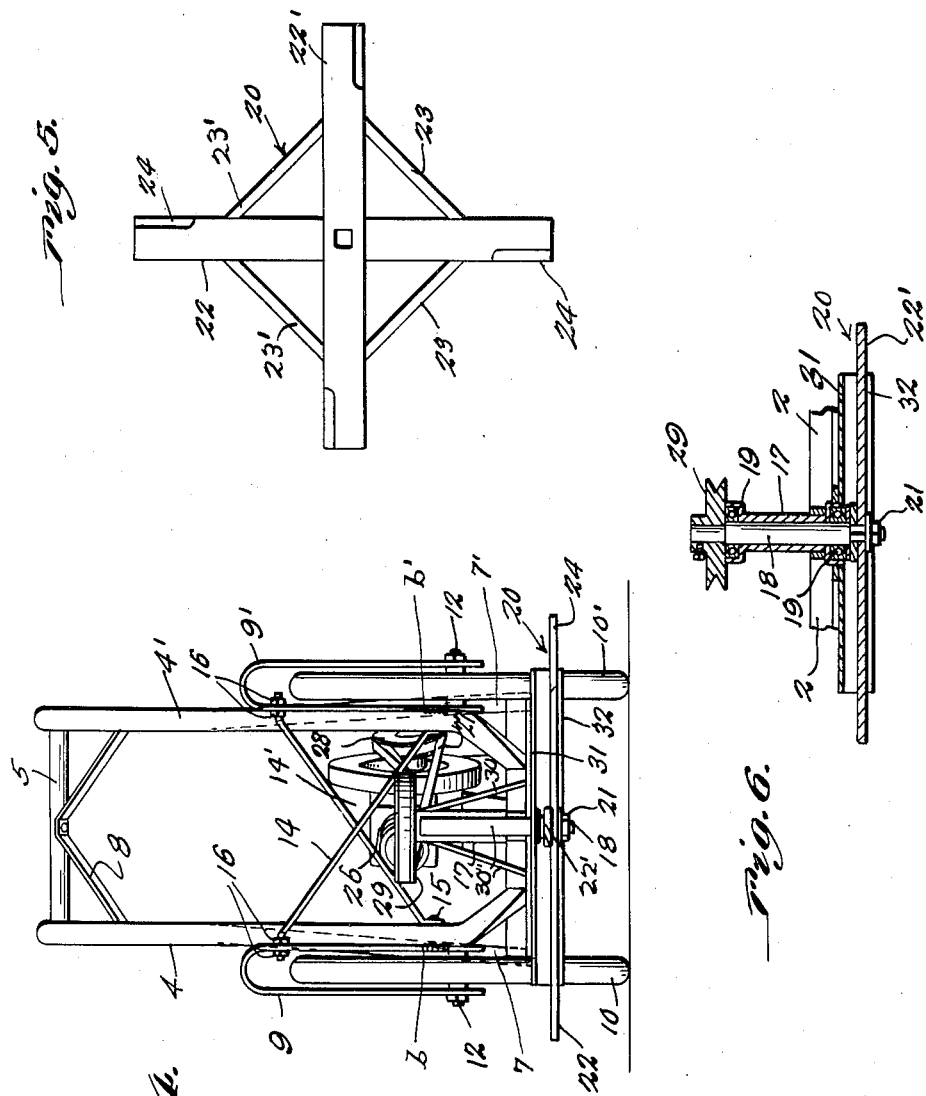
Inventor
Willard Dielschneider
By Clarence A. O'Brien
and Harvey B. Jacobson
Attorneys Patented Oct. 3, 1944

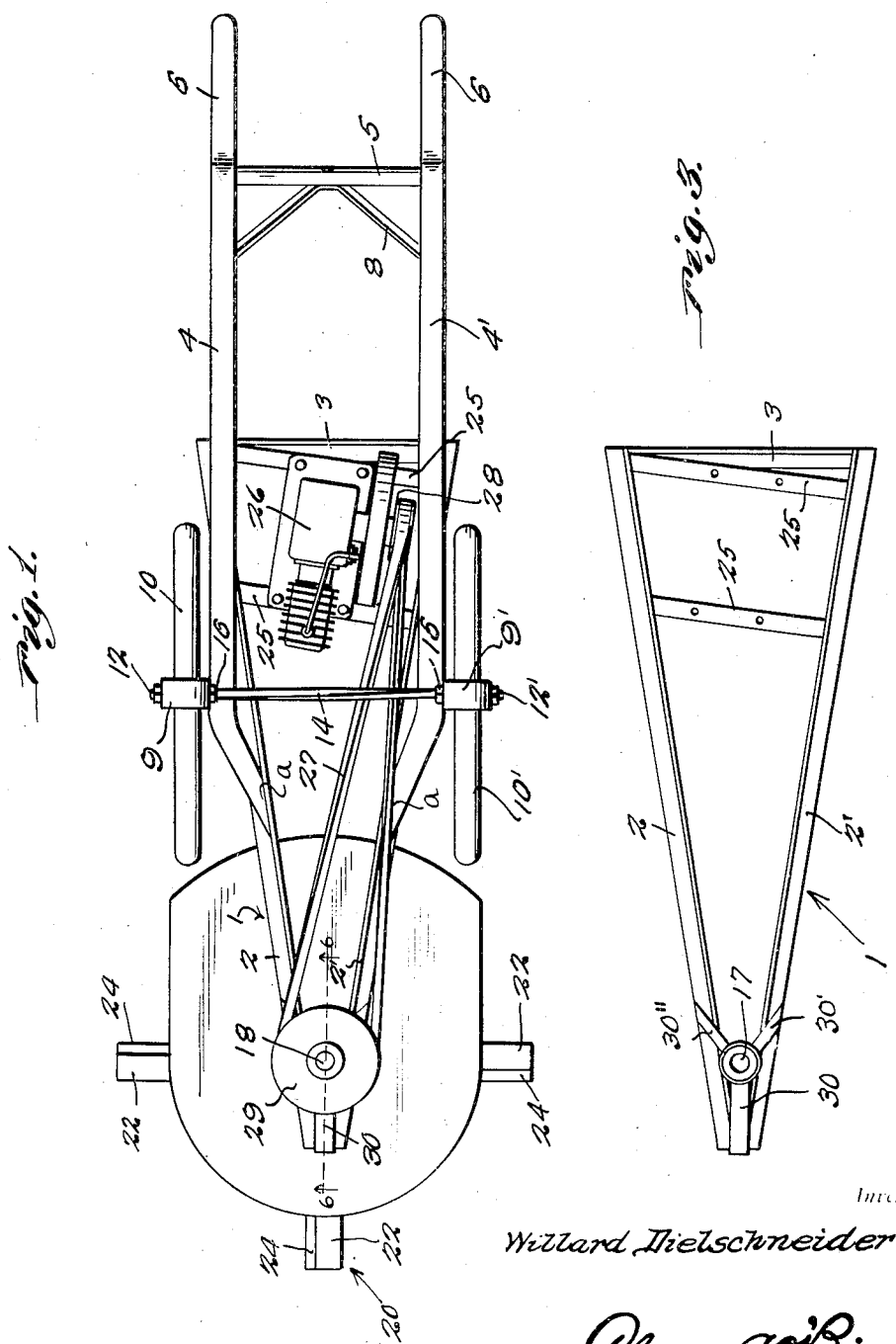

2,359,358

UNITED STATES PATENT OFFICE 2,359,358

WEED MOWING MACHINE

Willard Dielschneider, Conrad, Iowa

Application June 9, 1943, Serial No. 490,187

2 Claims. (Cl. 56—25.4)

The present invention relates to new and useful improvements in weed mowing machines and has for one of its important objects to provide, in a manner as hereinafter set forth, a device of this character which is adapted to cut close to fences, walls, etc.

Another very important object of the invention is to provide, in a weed mowing machine of the walking type comprising a power driven cutter rotatable in a horizontal plane, a novel construction and arrangement for adjustment whereby said cutter may operate at different heights.

Other objects of the invention are to provide a weed mowing machine of the character described which will be comparatively simple in construction, strong, durable, highly efficient and reliable in use and which may be manufactured at low cost.

All of the foregoing anad still further objects and advantages of the invention will become apparent from a study of the following specification, taken in connection with the accompanying drawings wherein like characters of reference designate corresponding parts throughout the several views, and wherein:

Figure 1 is a top plan view of a machine constructed in accordance with the present invention.

Figure 2 is a view in side elevation thereof.

Figure 3 is a top plan view of the frame.

Figure 4 is a view in front elevation of the machine.

Figure 5 is a plan view of the rotary cutter.

Figure 6 is a view in vertical longitudinal section, showing the mounting of the rotary cutter and taken on the line 6—6 of Figure 1.

Figure 7 is a detail view in perspective of the cutter shaft.

Figure 8 is a view in elevation of the upper portion of one of the wheel forks, a portion thereof being broken away in section.

Referring now to the drawings in detail, it will be seen that the embodiment of the invention which has been illustrated comprises an elongated horizontal frame which is designated generally by reference numeral 1. The frame 1 is of angle iron and includes forwardly converging side bars 2, 2' between the rear end portions of which a cross member 3 extends. The bars 2, 2' and 3 may be connected together in any suitable manner.

Metallic handles 4, 4' are rigidly secured at one end to the side bars 2 at intermediate points $a$. A strut 5 extends between the handles 4, 4' adjacent the grip portions 6 thereof. A substantially V-shaped brace 8 is secured to the strut 5 and to the handles 4, 4'. Additional braces 7, 7' extend between the handles 4, 4' and the rear end portion of the frame 1.

Metallic forks 9, 9' are fixed vertically on the forward portions of the handles 4, 4' and for instance by welding as at $b$, $b'$. Pneumatic tired supporting wheels 10, 10' are journaled in the forks 9, 9'. The lower portions of the legs of the forks 9, 9' have formed therein spaced openings 11 in which the axles 12, 12' of the wheels 10, 10, are selectively insertable for vertically adjusting the machine. Legs as at 13 are provided beneath the rear end portion of the frame 1 for supporting this end of the machine when said machine is not in operation.

Crossed braces 14, 14' are provided for the forks 9. The braces 14, 14' are in the form of metallic rods having one end portion rigidly secured to the inner sides of the handles 4, 4' as at 15. The other end portions of the braces 14, 14' are threaded and extend through the upper inner portions of the forks 9, 9'. Pairs of nuts 16 secure the upper end portions of the braces 14 to the forks 9, 9'. Adjustment of the nuts 16 permits the wheels 10, 10' to be cambered as desired. There is sufficient give or resiliency in the forks 9, 9' to allow this.

Welded between the forward end portions of the frame bars 2, 2' is a vertical metallic sleeve 17. A shaft 18 is journaled in the sleeve 17. Ball bearings 19 are provided for the shaft 18.

A cutter 20 is rigidly but removably secured by means including a nut 21 on the lower end portion of the shaft 18 for rotation in a horizontal plane beneath the frame 1. As illustrated to advantage in Figure 5 of the drawings, the cutter 20 comprises crossed blades 22, 22' between which braces 23, 23' extend. The blades 22, 22' each include a cutting edge 24 on their outer end portions.

Metallic bars 25, 25' are mounted diagonally on the rear end portion of the frame 1. Mounted on the bars 25 is a suitable air cooled engine 26. The engine 26 is operatively connected to the cutter shaft 18 by a twisted belt and pulley connection 27. As best seen in Figure 1 of the drawings, the engine 26 is mounted diagonally on the longitudinal center of the frame 1 for aligning the vertical belt pulley 28 thereon with a horizontal belt pulley 29 on the upper end portion of the shaft 18. Braces 30, 30', 30" extend between the upper portion of the sleeve 17 and the frame 1.

Mounted horizontally beneath the forward portion of the frame 1, above the cutter 20, is a shield 31 in the form of a metallic plate. The shield 31 includes a depending flange 32 on its rear end. The blades 22, 22' of the cutter 20 are of a length to project beyond the side and front edges of the shield 31.

It is thought that the operation of the machine will be readily apparent from a consideration of the foregoing. Briefly, the machine is balanced in a substantially horizontal plane on the supporting wheels 10, 10'. The construction and arrangement is such that very little physical effort on the part of the operator will be required to balance the machine on the wheels 10, 10'. With the engine 26 in operation, the cutter 20 is rotated at the desired speed in a horizontal plane. Of course, the rapidly rotating blades 20, 20' sever or cut the weeds in the path of the machine as it is moved forwardly over the ground. The construction also is such that the machine may be caused to cut close to walls, benches, etc.

By adjusting the axles 12, 12' of the wheels 10, 10' in the openings 11, the cutter 20 may be raised or lowered to operate at the desired height.

It is believed that the many advantages of a weed cutting or mowing machine constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A mowing machine of the character described comprising a horizontal, elongated frame, a pair of handles secured to the frame at an intermediate point and extending rearwardly therefrom, a pair of vertical forks fixed on the forward portions of said handles in the rear of said intermediate point, the legs of said forks having spaced openings therein, axles insertable selectively in the openings, wheels journaled on said axles and operable in the forks, a cutter rotatably mounted beneath the forward end portion of the frame, and an engine mounted in the rear of said forks and operatively connected to said cutter.

2. A mowing machine of the character described comprising an elongated, horizontal frame, a pair of handles secured to the frame at an intermediate point and extending upwardly and rearwardly therefrom, vertical forks mounted on the forward portions of the handles, supporting wheels rotatably mounted in the forks, crossed braces having one end secured to the handles and their other end portions adjustably connected to the upper portions of the forks for cambering the wheels, an engine mounted on the rear end portion of the frame, a cutter rotatable in a horizontal plane beneath the forward portion of the frame, and means operatively connecting said engine to said cutter.

WILLARD DIELSCHNEIDER.